Jan. 26, 1937.     K. STUART     2,068,893
APPARATUS FOR PRODUCING LAMINATED MATERIALS
Filed Sept. 18, 1933     2 Sheets—Sheet 2
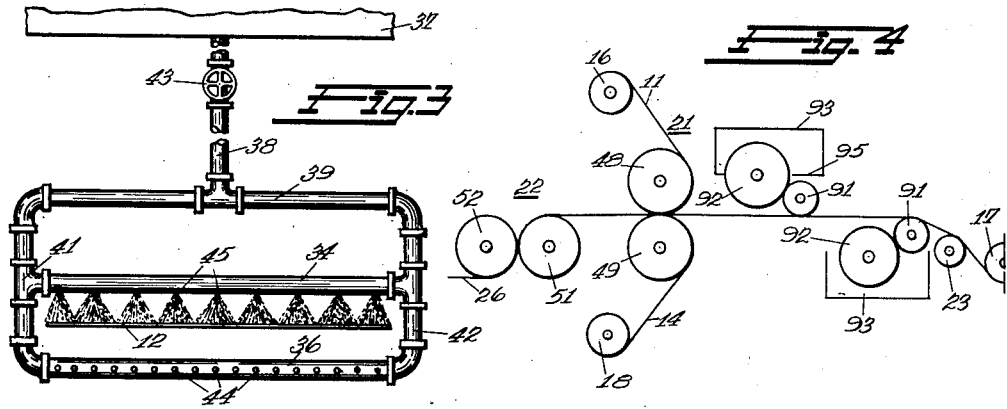
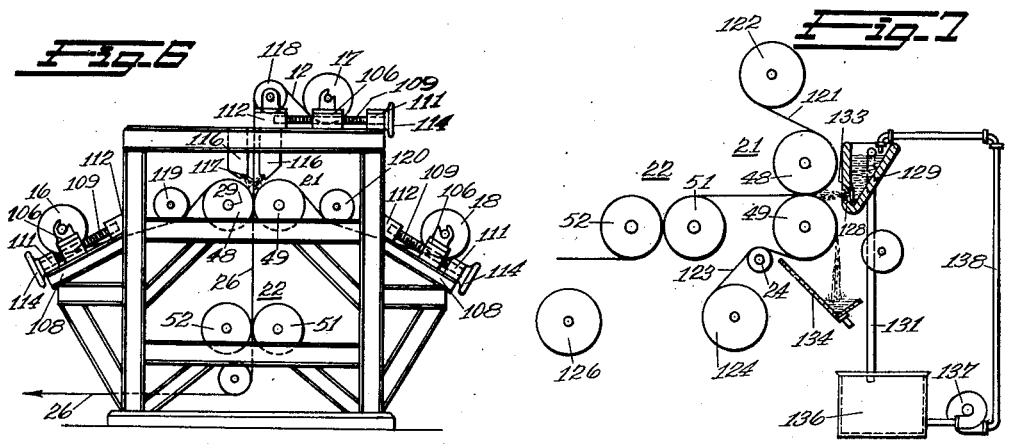
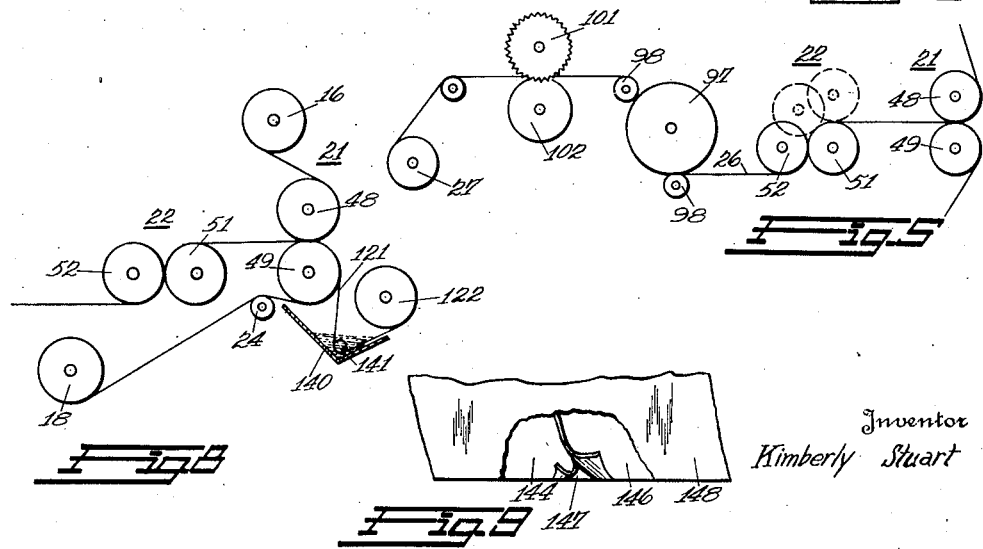
Inventor
Kimberly Stuart
Strauch & Hoffman
Attorneys Patented Jan. 26, 1937

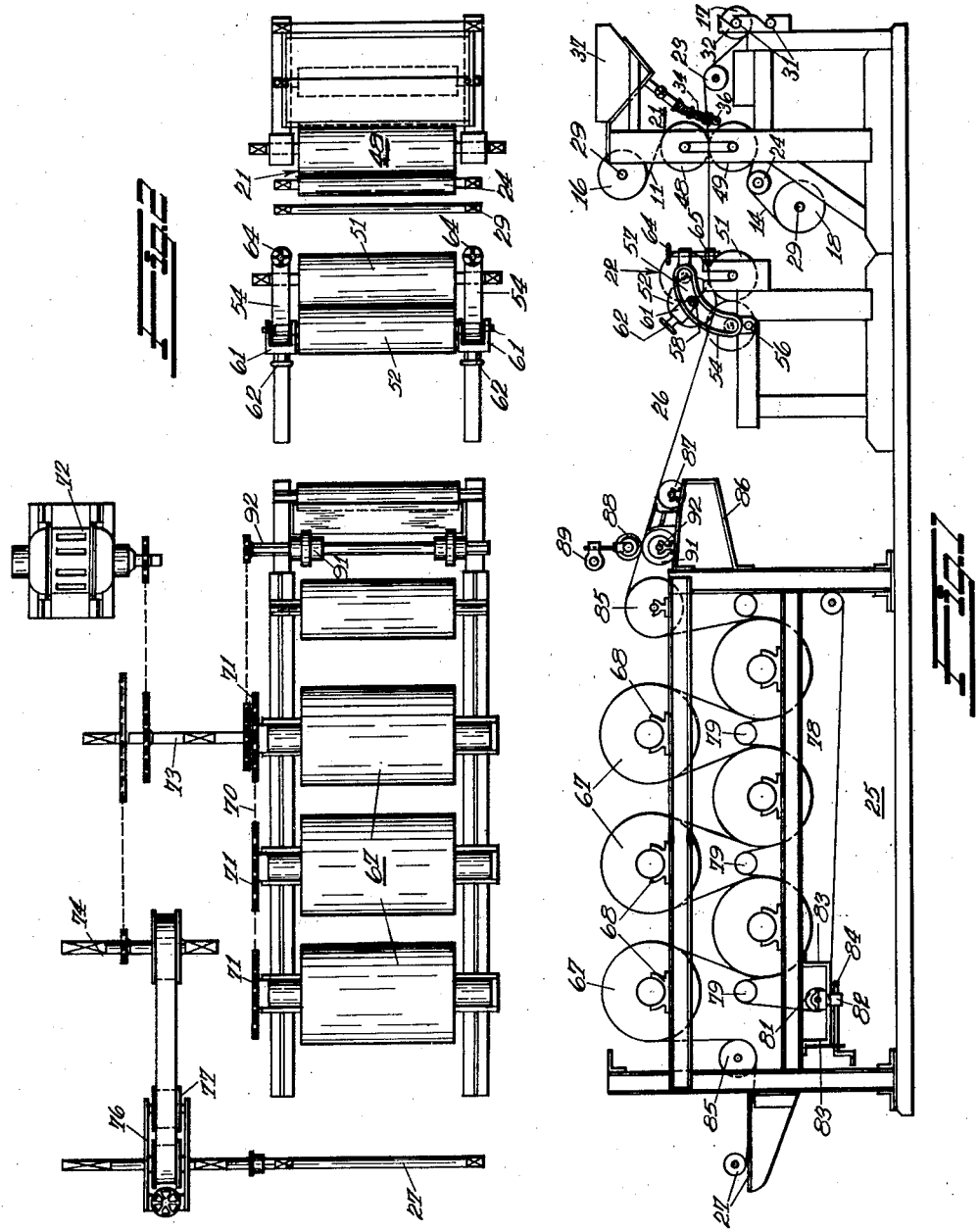

2,068,893

UNITED STATES PATENT OFFICE 2,068,893

APPARATUS FOR PRODUCING LAMINATED MATERIALS

Kimberly Stuart, Neenah, Wis., assignor, by mesne assignments, to Garrett B. Linderman, Jr., Beverly, N. J.

Application September 18, 1933, Serial No. 689,995

7 Claims. (Cl. 154—37)

The present invention relates to methods and apparatus for adhesively joining the individual components or laminations of laminated structures to produce such structures continuously in an economical manner, and when so desired, at high speeds.

More particularly, the present invention is concerned with the production by novel methods and apparatus of laminated structures of varying widths, which include as an element a layer or layers of metallic foil in single or multiple widths and especially aluminum foil.

The present invention is also concerned with the provision of adhesives which I have discovered to be suitable for joining the individual components of laminated materials in which aluminum foil comprises one or more of the elements of the laminated structure.

Prior to my invention to be fully disclosed herein, no successful methods and apparatus were available for adhesively joining foil and paper or other fibrous material in uniform facial contact to produce a wrinkle free and permanently joined laminated product. By following my novel methods and employing my novel apparatus, laminated material and more particularly laminated material in which a layer of aluminum foil is concealed between two layers of paper or other suitable fibrous material may be produced continuously and rapidly in an economical manner. My novel methods and apparatus are also equally applicable to the continuous and rapid production of laminated materials in which a layer of paper of any desired thickness, or a relatively heavy fibrous material such as cardboard is covered on one or both sides with a layer of aluminum foil adhesively joined thereto in uniform facial contact with no wrinkles or surface blemishes.

Accordingly it is a primary object of the present invention to provide novel methods and apparatus for the continuous and rapid production, in an economical manner, of laminated materials of any desired width, comprising a layer or layers of aluminum foil adhesively joined in uniform facial contact with one or more layers of paper of any desired thickness, cardboard or other desired and suitable fibrous material.

Another object of the present invention resides in the provision of novel methods and apparatus for producing a novel wide laminated structure embodying a multiple width layer or layers of aluminum foil.

A still further and related object of the present invention is to provide a novel form of wide laminated material embodying a layer or layers of aluminum foil made up of two or more parallel strips of foil of commercial width with the meeting edges of the parallel strips overlapped or butt joined.

Still another object of the present invention is to provide a novel form of apparently seamless wide laminated material embodying two layers of paper of any desired thickness or heavy fibrous material such as cardboard concealing a layer of aluminum foil made up of one or more parallel strips of foil of commercial width with their overlapping edges adhesively joined.

A further object of the present invention resides in the provision of a novel form of laminated material in which a central component layer of aluminum foil is concealed between two layers of fibrous material, one of which is in the form of a relatively heavy sheet of paper, the remaining layer being in the form of a relatively light weight sheet of paper whereby the laminated material exhibits a tendency to curl because of the difference in tension between the two surfaces thereof.

In practicing my novel methods for producing laminated materials which include a layer or layers of metallic foil, the nature of the material so produced may be varied by applying heat in differing degrees of intensity. My novel apparatus, forming a part of the invention to be disclosed herein, is adapted to apply heat in the production of foil bearing laminated products and use of the means for applying the heat may be omitted when desired. It is therefore possible to produce laminated materials embodying a layer or layers of metallic foil having widely differing characteristics. This wide range of characteristics adapts the laminated materials so produced to a wide range of special uses.

A further object of the present invention is to provide novel methods for the continuous and rapid production of laminated materials embodying a layer or layers of metallic foil and especially aluminum foil, in which the application of heat in varying degrees of intensity is included as a step, the degree of heat applied being governed in part by the desired characteristics of the laminated material.

A further object of the present invention is to provide novel apparatus for carrying out the object immediately foregoing, in which provision is made for applying heat regulated in accordance with the desired characteristics which the completed laminated material is to possess and in which the application of heat may be omitted for special purposes or when producing laminated material of the kind in which the foil layers are exposed.

Still another object of my invention is to provide adhesives which are particularly effective when used to secure in intimate facial contact the component layers of laminated materials embodying aluminum foil and which are particularly effective when used in the practice of my novel methods to be disclosed herein and with the novel apparatus of my invention employed in carrying out these methods.

Another object of my invention is to provide a series of novel adhesives for securing in intimate facial contact the component layers of laminated materials.

It is a further and related object of my invention to provide a series of laminated materials differing in characteristics throughout a wide range, produced by joining the component layers thereof by an adhesive selected from the series of novel adhesives of my invention.

By selective use of the special adhesives, the provision of which forms a part of the present invention, in combination with the controlled application of heat, further variation in the characteristics of the laminated materials produced by following my novel methods and employing my novel apparatus may be had, which further increases the range of uses satisfied by laminated materials produced in accordance with my invention.

A further object of the present invention therefore resides in the use of special and novel adhesives in combination with the controlled application of heat to produce laminated aluminum foil and fibrous products having varying characteristics and adapted to a wide range of uses.

I have made the further discovery that, if in the production of laminated materials including a layer or layers of aluminum foil, the application of heat is omitted entirely, the material may be embossed or corrugated without separation of the component layers. The formation of blisters or other flaws caused by localized separation of the laminations is avoided by embossing the laminated material cold, so that the moisture which is allowed to remain in the material by omitting the heating and drying step during production does not produce vapors under pressure between the component layers.

A still further object of my invention therefore is to provide novel methods and apparatus for the continuous and rapid production of embossed or corrugated foil bearing laminated materials, free from blisters or other flaws caused by separation of the component layers.

A further object of my present invention is to provide novel methods and apparatus for continuously supplying adhesive in either paste or liquid form to one or more of the individual strips or sheets prior to their union in intimate facial contact to form a firmly adherent laminated material.

In the practice of my invention in one of its embodiments, it is a still further object to control the evaporation of the volatile solvent or solvents in the adhesive applied to one or more of the individual strips or sheets by varying the distance of its point of application with respect to the point where the sheets are initially united.

Still another object of the present invention is to provide novel methods for producing laminated materials, and more particularly laminated materials including a layer or layers of aluminum foil, in the practice of which the individual components or laminations are brought together and passed between opposed pressure rolls of differing degrees of hardness after one or more of the individual laminations have been uniformly coated with an adhesive and preferably one of the adhesives to be disclosed hereinafter.

Still another and closely related object of the present invention is to provide novel apparatus for producing laminated materials comprising opposed pressure rolls of differing degrees of hardness.

Still another object of the present invention is to provide novel methods for producing laminated materials and more particularly laminated materials including a layer or layers of aluminum foil in the practice of which the individual laminations, after one or more have been coated with an adhesive, are initially brought together and passed between opposed pressure rolls of differing degrees of hardness and are thereafter passed between a second set of opposed pressure rolls of differing degrees of hardness.

Still another object of the present invention is to provide novel apparatus for producing laminated materials comprising one or more sets of opposed pressure rolls of differing degrees of hardness.

Still another object of the present invention is to provide novel apparatus for the production of laminated materials including a layer or layers of aluminum foil in which compression rolls are provided for compressing laminated materials passed therebetween, one of which is adjustable about the circumference of the other to hold the laminated material in contact with the peripheral surface of the non-adjustable roll over a variable arc of contact, the arc of contact being selected according to the type of paper or other fibrous material which is to be laminated with a layer or layers of aluminum foil.

Still another object of the present invention is to provide novel methods for producing laminated materials and more particularly laminated materials including a layer or layers of aluminum foil in the practice of which the laminated material is drawn between one or more sets of freely rotatable compression rolls thus contributing to the production of a smooth wrinkleless product having uniform adhesion between the laminations.

Still another and closely related object of the present invention is to provide novel apparatus for producing laminated materials comprising one or more sets of freely rotatable compression rolls between which the laminated material may be drawn by power driven means frictionally or otherwise operatively engaging the completed portion of the laminated material.

Still another object of the present invention is to provide methods and apparatus for laminating aluminum foil and fibrous material together in a smooth and wrinkle free manner, by bringing the foil continuously to the point of union with the fibrous material without flutter or whip of the moving sheet of foil.

Other and more specific objects of my invention will appear in the following disclosure of preferred forms of my invention, and are defined by the terms of the appended claims.

Referring to the drawings in which like reference characters indicate like parts:

Figure 1 is a view in side elevation illustrating diagrammatically one embodiment of my novel apparatus for laminating foil to paper or other fibrous material.

Figure 2 is a view in plan of the apparatus diagrammatically shown by Figure 1.

Figure 3 is a view in front elevation to an enlarged scale of the adhesive applying means shown in connection with Figure 1.

Figure 4 is a diagrammatic view in side elevation of a further embodiment of my novel apparatus comprising means for supplying adhesive in paste form to one of the component elements of the laminated material prior to its entry between the opposed laminating rolls.

Figure 5 is a diagrammatic view in side elevation of a slightly modified form of the apparatus illustrated in Figure 1 disclosing a novel arrangement of the apparatus for producing embossed or corrugated laminated material.

Figure 6 is a diagrammatic view in side elevation of another embodiment of my novel apparatus in which paste adhesive is supplied directly between two or more of the individual layers of the laminated material prior to their union.

Figure 7 is a view similar to Figure 1 of the apparatus shown therein slightly modified to permit direct application of the adhesive to one of the individual layers of the laminated structure prior to their union.

Figure 8 is a view similar to Figure 1 of the apparatus shown therein including a slightly modified form of the adhesive supplying means.

Figure 9 is a perspective view of a novel form of wide laminated foil and fibrous material.

Figures 1 and 2 of the drawings illustrate somewhat digrammatically one embodiment of my novel apparatus for adhesively joining the component layers of laminated material in accordance with the novel methods to be disclosed as the description of the invention proceeds. Referring to these figures for the present, the individual sheets 11, 12 and 14 which are to be facially united to produce the laminated material, are drawn forwardly from the rolls of material 16, 17 and 18 respectively, and pass between two sets of opposed pressure rolls 21 and 22 after the desired adhesive has been applied. The pressure rolls of each set are mounted so as to be freely rotatable and the disposition of these rolls and the relative hardness of the material of which they are formed are important features of the present invention and will be described in detail hereinafter. An idler 23 serves to guide the material passing from roll 17 so that adhesive may be applied to the moving surface of the material at a definite point. A similar idler 24 serves to guide the material passing from the material roll 18.

The heating and drying apparatus 25 is conveniently located as shown immediately following the second set of pressure rolls 22 and serves to draw the laminated material 26 forwardly between the two sets of pressure rolls 21 and 22 in a manner to be described.

A reeling stand 27 may be located beyond the drying apparatus 25 to wind the laminated material 26 in roll form if desired, after it has been brought forward from the dryer. If desired the laminated material 26 may be passed directly from the drying apparatus 25 to any known form of cutting machine where it will be measured and cut in lengths suitable for the use to which it is to be put.

It is to be understood that the heating and drying apparatus 25 may be omitted entirely for the purpose of producing laminated materials having special properties or which are to be further processed as by embossing or corrugating. In this instance, the laminated material 26 may be drawn forwardly through the pressure rolls by the arrangement to be hereinafter described which is shown on Figure 5.

The set of opposed pressure rolls 21 initially receives the individual component sheets which are drawn forwardly from the rolls of material 16, 17 and 18 by the drier 25 or other sheet propelling mechanism. In the present instance, these component sheets or plies are to be facially united to produce a three ply laminated structure. Either three ply laminated material in which the foil forms the central layer or in which foil is applied to both surfaces of a central layer of fibrous material, may be produced by the apparatus of Figure 1 with relatively slight changes and minor adjustments.

When operating to produce either form of laminated material, it is essential that the moving sheet or sheets of foil do not flutter or whip prior to entering the pressure rolls so as to avoid formation of wrinkles and creases in the finished product.

Where the foil is supplied from rolls of relatively large diameter the tendency of the moving web of foil to flutter and whip is more pronounced. To the end that all fluttering or whipping of the foil web be eliminated, the shaft or arbor 29 which carries the foil roll is preferably supported on bearings which are adjustable in position with respect to the point at which the foil enters the nip of the set of pressure rolls 21.

As has been previously pointed out, either the foil or the fibrous material may form the central layer of the laminated structure which is to be produced and therefore adjustable bearings are preferably provided for carrying the supporting shafts or arbors 29 of all the material rolls 16, 17 and 18.

The adjustable feature of these bearings may be of any suitable type, for example, of the kind shown on Figure 6 of the drawings, which are to be described.

When the apparatus is to be operated to produce laminated material in which fibrous material constitutes the central layer or ply, the supporting bearings for the arbor 29 which carries the material roll 17 may be non-adjustable. In the specific example of Figure 1, notches 31 in members 32 which are attached to the supporting frame of the apparatus serve as bearings for rotatably supporting the roll of material 17.

The adhesive is applied to the individual sheets by spraying from perforated spray pipes 34 and 36 which are supplied from a storage receptacle 37 suitably carried by the supporting frame of the apparatus. A conduit 38 which is connected by a T connection with a pipe 39 conducts the adhesive from the receptacle 37 to the spray pipes 34 and 36 by way of lateral pipe connections 41 and 42. Pipe connections 41 and 42 admit adhesive to both ends of spray pipes 34 and 36 insuring even distribution of adhesive throughout their length. A valve 43 permits regulation and stopage of the flow of adhesive when desired.

Spray pipe 36 is perforated on the side so that it projects a spray of adhesive from holes 44 which are spaced at regular intervals along the pipe against the surface of sheet or web 14 as it travels up into the nip of pressure rolls 21. The adhesive from pipe 36 which is provided with spaced perforations 45 is delivered vertically onto the sheet or web 12 prior to its entry between the set of pressure rolls 21. Spray pipe 34 preferably has about one-half as many perforations as does pipe 36 as I have found that this relationship between the number of perforations 45 and 44 gives the best distribution of the adhesive.

The arrangement of applying liquid adhesive just described permits of applying the adhesive uniformly to the individual sheets while they are running at good rates of speed.

The adhesive supply means illustrated in Figures 1 and 3 may be arranged with separate conduits 38 to feed spray pipes 34 and 36 independently, to permit of their distance from the nip of pressure rolls 21 being increased or decreased so that any volatile solvents in the adhesives may be given time to evaporate partially before actually entering between the pressure rolls. The point of application of the adhesive can thus be varied according to the type of material used.

Where two layers of foil are to laminate with a central layer of paper or other fibrous material, heat is preferably not applied by the drying apparatus 25, and the tack of the adhesive is controlled by varying the distance of the point of application of the adhesive from the laminating rolls 21. The distance selected is such that enough moisture is left in the adhesive to impart proper strength to the paper and give a good bond.

Also with an arrangement using separate conduits 38 to feed the spray pipes 34 and 36, different kinds of adhesive may be ejected from each of the pipes to produce laminated material in which opposite layers are joined by adhesives having different properties, where this is desirable for special purposes.

Turning now to the disposition of the pressure rolls and the material of which they are formed, the first set of pressure rolls 21 comprises an upper roll 48 and a lower roll 49. One of these rolls, in the present example, roll 49 is of harder material than the upper roll and may be made of suitable metal or other relatively hard material such as vulcanite. Roll 48 is made of relatively softer material and may be formed of soft rubber or other suitable elastic material. As indicating the degree of softness of the roll 48, it preferably has a density of 50 to 200, according to the Pusey and Jones plastometer. When producing laminated materials joined by certain paste adhesives, a metal roll in combination with the rubber roll or two metal rolls are preferably used.

The second set of pressure rolls 22 comprises a roll 51 and a second roll 52 which is preferably adjustable in the manner illustrated by the drawings. These rolls are more yielding than rolls 48 and 49 and may be described as medium hard, having a density of about 60 points on a plastometer reading. There is a differential, however, in the hardness of about 20 to 25 points between the roll 52 and the roll 51, the roll 51 being about 20 points harder than the top roll. This combination of hard and soft rolls operating to initially unite the laminated structure followed by two yielding rolls, one of which is less yielding than the other, through which the laminated material is drawn contributes to the rapid production of a perfectly smooth and wrinkleless product.

The bearing surfaces of the centrally located rods or shafts of the pressure rolls 48 and 49 are journalled so as to be freely rotatable in bearings which are carried by the supporting framework of the apparatus. The bearings for the lower roll 49 are preferably non-adjustable, while the bearings for the upper roll 29 are preferably adjustable vertically for the purpose of applying differing degrees of pressure at the opposed tangential portions or nip of the rolls. Adjustment of the bearings for roll 48 may be accomplished in any well known manner but it is desirable that an equal force be exerted downwardly by the pressure adjusting means, on each of the bearings.

As previously described roll 52 of the second set of rolls 22 is preferably made adjustable about the periphery of the roll 51 so that the arc of contact of the web 26 with this latter roll may be varied as I have discovered that various positions of the roll 52 increase the efficiency of the rolls 22 with different types of paper and stock board.

Adjustment of the roll 52 may be had by the arrangement illustrated in Figure 1 in which a pivoted arcuate member 54, pivoted to the frame of the apparatus at 56, is provided with a slot 57. A guide block or roll 58 rotatably supports the central shaft or arbor of the roll 52 and is movable to various positions in the slot 57. A bracket 61 fits over the member 54 and is engaged at each side with the guide block 58. The block, and hence the central shaft of the roll 52, is retained in its adjusted position along the slot 57 by means of a clamping screw 62 bearing on the member 54 which is threadedly engaged in bracket 61. This arrangement is duplicated on the other side of the apparatus to support the opposite end of roll 52.

When the screws 62 are tightened the outer wall of the slot 57 is clamped between the guide block 58 and the inner end of the screw 62 which holds the roll 52 in its selected position of adjustment. To change the position of roll 52, the screws 62 at each end of the roll are loosened to release the bracket 61 and the guide block 58 after which the roll may be moved to any selected position. Adjustment of pressure at the opposed tangential surfaces of the rolls 51 and 52 is provided for by screw 64 which is threadedly engaged in a suitable bracket 65 on the framework of the apparatus. The upper end of the screw passes through an aperture in the end of the member 54 and as the screw is turned downwardly into the bracket 65, the head of the screw presses down on the end of member 54 to swing it about the pivot 56 and so alter the pressure between the rolls.

The heating and drying apparatus 25 comprises cylindrical drums 67 suitably supported in bearings 68 carried by the framework of the apparatus. These drums are provided with suitable connections to a source of steam so that they may be heated for the purpose of drying the laminated material as it passes over and in contact with the periphery of each drum in turn. The drums are caused to rotate in unison by suitable drive means, for example, by a continuous chain 70 or other flexible driving member which engages sprockets 71 keyed or otherwise secured on the supporting shafts of the drums 67. A motor 72, preferably of the variable speed type drives a shaft 73 from which driving power is imparted to the chain 70. An intermediate shaft 74 driven from the motor 72 imparts driving power to the winding reel 27 through the friction belt drive which is regulated by idler pulley 77.

The web 26 of laminated material is drawn forward from the pressure rolls 21 and 22 by means of a band 78 of flexible material which may be a regular felt similar to that used on paper machines which holds the laminated material tightly against the heating drums. The band 78 is guided over a series of idler pulleys 79 so that it embraces a wide arc of each of the lower heating drums 67. One of these idler pulleys 81 is carried by movable bearings 82 slidably supported on brackets 83 so as to provide means for tightening the band 78. The bearings 82 each threadedly receive a rod 84 which upon being turned, moves the adjustable bearings 82 to tighten or loosen the band 78. The sheet 26 is guided by idler rollers 85 as it approaches and leaves the drums 67.

If desired, a sheet trimmer may be provided for trimming the width of the sheet 26 to remove the selvage edge before the laminated material goes to the drivers. The sheet trimmer may be conveniently mounted on the frame of the drying apparatus by means of brackets 86 which support the guide roller 87. The sheet trimmer comprises rotary cutters 88 supported from a rack shaft 89 so that they may be thrown out of cutting engagement with the sheet 26. The rotary cutters cooperate with circular cutter members 91 integral with or secured to a shaft 92 which is driven from the shaft 73.

In operation of the apparatus described in connection with Figures 1 and 2, material roll 17 may be aluminum foil in which case the rolls 16 and 18 will contain paper or other fibrous material. As previously described, the bearing supports for the shaft 29 of the aluminum foil roll are preferably adjustable to allow for positioning of the roll to avoid fluttering and whip of the web of foil as it moves toward the nip of rolls 21. The foil as it approaches the rolls 21 is supported in position to receive the adhesive from pipe 34 by the idler 23. The adhesive sprayed upon the foil by the pipe 34 serves to unite the upper layer of paper 11 to the surface of the foil. The pipe 36 sprays adhesive onto the surface of the lower sheet 14 which serves to unite it to the under surface of the foil. The surplus adhesive from the pipe 36 which is sprayed upon the sheet 14 may be caught in any suitable pan or receptacle.

As the sheets of paper and foil properly coated with adhesive, enter the nip of the rolls 21, they are pressed into intimate contact and thereafter pass to the rolls 22. In the interval between the rolls 21 and 22, the laminated material is kept taut and smooth as the rolls 21 and 22 are not driven but exert a constant drag on the laminated material. This drag gives a smoothing action which would be impossible of attainment if the rolls of either set were power driven.

The variation in hardness between the individual rolls of each set causes a greater area of contact between the peripheral surface of the rolls and the laminated material which enhances the smoothing action and insures an even distribution of pressure on the opposite surfaces of the laminated material. The greater yieldability of the second set of rolls still further enhances the smoothing action and causes the laminated material to be wrinkle free as it leaves them.

The operation of the drying apparatus will be obvious from the description given herein. For general purposes, the temperature of the dryer rolls is held at approximately 170° F., but this temperature is subject to a wide variation, as with various weights of fibrous material together with various adhesives and weights of foil, the time of drying will necessarily vary. In some cases, the drying is preferably to be accomplished rapidly and in others at a slower rate, depending on the contemplated use of the laminated material. In other cases, and specifically where the laminated material consists of a sheet of fibrous material covered on both surfaces by a layer of adherent aluminum foil, the heating step will be omitted. However, in the event that an adhesive is used requiring the application of heat to give it maximum holding power without formation of a gas or vapor between the layers, the drying apparatus disclosed may be effectively used for applying heat.

When operating to produce laminated material in which paper or other fibrous material forms the central layer, paper will be fed from roll 17 and rolls 16 and 18 will contain aluminum foil. The application of the adhesive may be accomplished as described in connection with the production of laminated material in which the foil forms the central layer, however, adhesive spray pipes 34 and 36 are preferably arranged in the manner previously described in connection with Figure 3 to provide for adjustment of the position of the spray pipes. With the adjustable spray pipes, the amount of solvent remaining in the adhesive on the coated sheets can be controlled to alter the tack of the adhesive which will vary in accordance with the distance of the point of application of the adhesive from the rolls and the speed of travel of the sheet.

In Figure 4 is shown a slightly modified form of the invention which differs from that shown in Figures 1 and 2 by including means for applying adhesive in paste or semi-fluid form. As in Figure 1, reference numeral 17 designates a roll of suitable fibrous material or aluminum foil which is drawn forwardly over rollers 91 that rotate in facial contact with an adhesive supplying roller 92 rotating in a box or tank 93 containing the adhesive in paste or semi-fluid form. The upper adhesive box is provided with a cover 95 which prevents a too rapid escape of the adhesive.

As the web 12 is drawn forwardly to pass between the pressure rolls, each face has a coating of the adhesive applied thereto by means of the rollers 91. The position of the boxes 93 is preferably made adjustable with respect to the first set of pressure rolls 21 so that the adhesive may be exposed to the atmosphere for a varying length of time after application to the web 12 so that some of the solvent may evaporate.

The outer plies of material 11 and 14 which are to be joined with the sheet or web 12 are drawn forwardly from the material rolls 16 and 18 in the manner described in connection with Figures 1 and 2, and the laminated material 26 resulting from the union of the component sheets may be passed through the several steps fully described in connection with Figures 1 and 2.

The modified form of the apparatus shown by Figure 5 of the drawings is especially adapted to the production of laminated material in which a central layer of paper or other suitable fibrous material is coated on both surfaces with a layer of aluminum foil. The two sets of press rolls 21 and 22 may be identical with those already described in connection with Figures 1 and 2. A drum 97 and rollers 98 in contact therewith serve to draw the laminated material forwardly through the successive sets of rolls 21 and 22 when the laminated material is not to be subjected to a heating and drying step. Either drum 97 or rollers 98 may be power driven to accomplish the desired result, the laminated material 26 being held in frictional contact with the drum by the rollers. A reeling stand 27 serves to wind the laminated material as it comes from the drum 97.

It is to be understood that the drum and roll arrangement of Figure 5 may be included in the apparatus of Figure 1 so that the laminated material may be drawn through the pressure rolls by either the heater drums 67 or the drum 97 depending on the kind of material which is being produced and the purpose for which it is intended.

Embossing or corrugating dies or moulds may be used to emboss or otherwise ornament the laminated material after it has been drawn through the laminating rolls. These dies or moulds may take the form of cooperating rolls 101 and 102 so that the embossing may be done continuously as the laminated material is delivered from the drum 97.

By running the laminated material through embossing rollers or between embossing dies while the rolls or dies are cold and while the material still contains some of the original moisture left in it from applying the adhesive, the material is embossed or corrugated without cracking the foil or the fibrous material. Cold formation of the embossing precludes generation of steam from the moisture in the adhesive and prevents separation of the layers and formation of blisters. The embossing operation is most successfully performed when there is quite a good deal of moisture still in the laminated material and this condition is best realized if embossing is carried out soon after the material is laminated.

With the apparatus of Figure 5 including either or both of the sets of rolls 21 and 22 and drum 97, adhesive coated paper may be produced in an economical manner. This is accomplished by laminating paper to one or both sides of an aluminum or other foil in the manner previously described and separating the paper from the foil. The paper so separated will be covered on one side with a uniform coating of adhesive. The coating may be carried out continuously by employing an endless band of foil and which repeatedly passes through the laminating rolls in contact with a moving web of paper.

A further modification of the laminating apparatus of this invention is shown on Figure 6 in which paste adhesive is fed directly between the individual sheets at the nip of the first set of press rolls. The relative position of the sets of press rolls 21 and 22 is changed so that rolls 21 are located above rolls 22 providing for a vertical feed of the adhesive and vertical travel of the laminated material 26. Otherwise these rolls are the same as have been fully described in connection with Figures 1 and 2. As before, rolls 48 and 49 differ in hardness and rolls 51 and 52 are more yielding than rolls 48 and 49, roll 51 being slightly harder than roll 52. Roll 52 may be made adjustable about the periphery of the roll 51 if desired, employing the arrangement comprising the bearing supports 54 of Figure 1.

The bearings for the supporting shafts or arbors 29 of the material rolls are adjustable in position. Provision for adjustment may be made in any suitable and convenient manner, for example, by slidably mounting the bearing blocks 106 of each set of bearings on parallel frame members 108 of the apparatus. A threaded rod 109 journalled for rotation in blocks 111 and 112 carried by the frame member 108 engages in a threaded aperture in bearing block 106 to shift the block as the handwheel 114 is turned.

Paste receptacles or boxes 116 are supported above the primary set of press rolls 21 and are provided with slots 117 extending the full width of the rolls 21. The lateral width of these slots is so chosen that the amount of paste adhesive ejected toward the nip of the primary set of press rolls is just sufficient to provide for a slight surplus which assures an even coating of the adhesive on the contacting sheets as they enter between rolls 21.

Idler roll 118 is positioned vertically above the primary press rolls 21 so that the sheet 12 is always fed into the nip of the rolls in a vertical position. This assures that the amount of adhesive applied to each side of the sheet will be kept constant and the possibility of getting more adhesive on one side of the sheet than on the other will be avoided.

Idler rolls 119 and 120 serve to guide the sheets 11 and 14 which are drawn from the material rolls 16 and 18. If desired, these idler rolls may be mounted on adjustable bearings similar to the bearings for material rolls 16 and 18 so that the idler rolls may be replaced by the material rolls 16 and 18 when operating to produce laminated material in which a layer of fibrous material is covered with foil.

The operation of the embodiment of the apparatus illustrated by Figure 6 will be readily understood from the preceding description of the operation of Figures 1 and 2. The laminated sheet 26 as it leaves the secondary set of press rolls 22 may be drawn forward by the dryer 26 or by a drum 97 described in connection with Figure 5.

Another modification of the apparatus of this invention is ilustrated by Figure 7 of the drawings which is especially adapted to the production of laminated material in which a layer of fibrous material is covered on one side only with an adherent layer of aluminum foil. The primary and secondary sets of press rolls 21 and 22 are the same in disposition and material as has been previously described. The sheet of aluminum foil 121 is drawn forwardly from the material roll 122. This roll of material is preferably carried on adjustable bearings which may be of the type described in connection with Figure 6 to eliminate fluttering or whipping of the foil sheet. The sheet of fibrous material 123 is drawn forwardly over the idler from the roll of material 124. In the event that fibrous material 123 is of a heavy character, the roll of material from which it is fed is preferably located at a greater distance from the press rolls 21 as indicated by the reference character 126. The material roll in this latter position may be conveniently accommodated on the framework which supports the secondary set of press rolls 22.

Adhesive is supplied to sheets as they enter the nip of the set of primary press rolls 21 from an elongated slot 128 in a fountain 129 containing the adhesive under a substantially constant hydrostatic head. When the adhesive is applied in this manner full advantage is taken of the capillary attraction between the fibrous material 123 and the adhesive, and also absorption of a portion of the adhesive. The degree of absorption varies with the amount of adhesive applied and the speed of the fibrous sheet 123 over the lower primary press roll 49. A slight surplus of the adhesive is preferably supplied, and to this end the orifice in the fountain 129, which is in communication with the drain conduit 131, is so located that the hydrostatic head above the slot 128 is kept sufficiently high to accomplish the purpose.

To accommodate different widths of foil and fibrous material, the effective length of the slot 128 is varied by regulating gates 133 which are movable lengthwise of the slot. Suitable means, for example, a rod provided with right and left hand threads in operative engagement with similarly threaded lugs on the gates 133 provide for moving the gates toward or away from the center of the fountain.

The surplus of the adhesive which flows over the sheet 123 is collected in a receptacle 134 from which it flows to the adhesive reservoir 136. A pump 137 continuously replenishes the supply of adhesive in the fountain 129 through the supply conduit 138.

In operation of the apparatus just described, it will be understood that the two ply laminated material may be drawn forwardly through the primary and secondary sets of press rolls 21 and 22 in the manner previously described in connection with the embodiments hereinbefore discussed in detail.

Figure 8 shows another slightly modified form of the apparatus of this invention particularly well adapted to the production of laminated foil and fibrous material in which the foil forms the central layer or ply. In this embodiment of the invention, the foil sheet 121 prior to its union with the external layers or sheets of fibrous material is passed through a body of liquid adhesive contained in the adhesive bath 140. The sheet of foil passes beneath a guide bar 141 or roller through the bath of adhesive and passes from the bath into contact with one of the layers of fibrous material. The distance between the guide bar 141 or roller and the point of initial contact of the foil with the paper layer is preferably as short as possible so as to avoid wrinkling of the foil.

Laminated material novel in form may be produced by concealing a layer of aluminum foil between two layers of paper which differ in thickness. This form of material is readily produced by employing my novel methods and apparatus disclosed herein.

The tendency of this material to curl, due to difference in tension between the two surfaces, makes it applicable to new uses where this tendency has marked advantages.

When this material, laminated as described, is applied to a surface such as wood or other material which warps, the differential in tension in the sheet itself tends to hold the material tight against the warping surface and prevents blistering or buckling.

This material is also especially adapted to covering tile so that in cases where the tile curves or warps, the material follows the bend in the surface of the tile. Tile of the kind contemplated, a product of the United States Gypsum Company, always warps in the same way and having laminated material with a definite curl to it prevents "blisters" where the paper sags away from the surface.

The material just described may be used for the purpose of sound proofing structures. When it is applied to a surface of the structural wall, it stands away from the surface by reason of its tendency to curl and the dead air space so provided muffles sound.

I have discovered that perfect union of aluminum foil and fibrous material to form a laminated structure may be obtained with the novel adhesives of my discovery which will now be disclosed in detail. For certain uses of the foil and fibrous material, a high rubber content latex, containing about sixty percent of rubber stabilized with ammonia. This latex in practice is diluted with water so that the percentage of solids is about forty-five percent. This latex is centrifuged and strained, which eliminates not only the undigested or coagulated pieces of rubber but also reduces the water soluble in the rubber solution to a minimum, giving a high concentration of pure rubber. This when stabilized with ammonia permits the use of a thick latex which sets rapidly as the ammonia is easily volatile and the residual moisture is at a minimum. Straining of the rubber latex as mentioned above may be readily accomplished by the use of cheese cloth to avoid lumps which result in the product unless this is done.

The latex so prepared, when used to join a layer or layers of fibrous material to a layer or layers of aluminum foil in the production of foil bearing laminated material, gives a firmly adherent bond between the layers, the adherent power of which increases as the laminated material ages.

The aging quality of the latex will be improved by the addition of small amounts of antioxidant so that the adherent power will still further increase with age. An antioxidant suitable for the purpose contains 55% of active antioxidant, the remainder being made up of water and a small amount of emulsifying agent. This antioxidant which is sold commercally by the E. I. Du Pont de Nemours Company, known as "Neojone L". This product is an emulsion of a liquid rather than a dispersion of a solid, and is for that reason not subject to growth in particle size and therefore well adapted for use in latex.

The latex adhesive while giving a close and firm bond between the several plies of the laminated product is not heat resistant, but permits separation of the plies upon heating. For certain purposes, a laminated material which may be separated into its component layers is desired and the latex adhesive will be used where the use of the material requires a separation. Latex has excellent water resisting properties so that laminated material joined with latex as the adhesive is practically waterproof. Laminated material well suited for general purposes can be produced by employing my novel methods and apparatus, using latex as the adhesive prepared in the manner disclosed above which I have found to be most effective for obtaining a permanent bond. In some instances casein may be incorporated in the latex.

Where the contemplated use of the laminated material requires a heat resistant adhesive, the adhesive bond between the fibrous material and the foil may be effected by using a heat resistant adhesive. A suitable adhesive for this purpose is sold commercially by Adler and Son, and is known as "Plymax" glue. This glue is in the form of a paste and is therefore readily applied by using the embodiments of the apparatus disclosed by Figures 4 and 6 of the drawings. This adhesive sets slowly taking approximately three months to reach its maximum holding power. Plymax is not waterproof when first applied, but it becomes so with aging and is very resistant to heat.

By combining latex as disclosed above and the Plymax glue above described in varying amounts, I have discovered that a range of new adhesives is produced which will adapt the laminated foil and fibrous material to different uses. Latex, as stated above, is very satisfactory as a water resistant adhesive but has poor resistance to heat. Plymax has much better heat resisting qualities but until thoroughly aged and properly set it is not as satisfactory in its waterproof character. In producing these new adhesives the percentage of Plymax varies from twenty-five to seventy-five percent of the total. The percentage is varied in accordance with the characteristic which is to predominate. Where a use is contemplated requiring water resistant adhesive, the percentage of latex will be near the maximum. Conversely where heat resisting qualities are desired, an excess of Plymax will be used.

Another paste adhesive which I have discovered to be very effective in joining fibrous material to aluminum foil is an adhesive paste, known as "Sphinx Paste" and obtainable from the Arabol Company.

Figure 9 of the drawings illustrates a novel form of wide laminated material in which the central foil layer is made up of two or more strips of foil of commercial width. Aluminum foil is usually supplied in 25 inch widths and to provide laminated material in sizes suitable for special industrial uses it is necessary to employ parallel strips of foil as the foil layer of the laminated material. I have discovered that the foil may be overlapped without the appearance of a visible seam so that the wide laminated material has the appearance of a continuous sheet.

Referring to Figure 9, strips of foil 144 and 146 are concealed between sheets or layers of paper 147 and 148. The foil strips are overlapped slightly, the width of the overlap varying from one quarter of an inch to one-eighth of an inch. The foil strips 144 and 146 are preferably coated on both sides with adhesive prior to being laminated with the paper so that a good adhesive bond is secured at the overlap between the edges of the foil strips and between the foil and the paper.

After the foil strips have been laminated with the paper layers, the raised surface of the paper caused by the added thickness of foil in the overlapping section is calendered to reduce the amount of bulge in the paper.

The wide laminated material just described is suitable for drawing paper and template purposes where a wide continuous sheet is desirable. This wide laminated material with foil outside is also useful as a building paper and is preferably made up in thirty-two inch widths for this purpose.

The present invention, as will be apparent from the foregoing disclosure, will be seen to present novel methods and apparatus for permanently joining aluminum foil and fibrous material in a rapid and economical manner not possible heretofore. The adhesives which I have discovered to be particularly effective when used to secure the aluminum foil to the fibrous material give a flexible bond, the holding power of which does not diminish with age.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. Apparatus for laminating sheet material comprising primary press rolls and secondary press rolls, said primary press rolls consisting of a yielding roll tangentially in contact with a roll of relatively harder material, said secondary press rolls consisting of a yielding roll tangentially in contact with a roll of less yielding material, and means for drawing strips of sheet material to be adhesively joined in facial contact through said primary rolls and thereafter through said secondary rolls, said secondary rolls being formed of a softer material than said primary rolls.

2. Apparatus according to claim 1 in which said primary rolls consist of a rubber roll having a density of from fifty to two hundred according to the Pusey and Jones Plastometer and a roll in tangential contact therewith formed of harder material.

3. Apparatus according to claim 1 in which said secondary rolls consist of a rubber roll having a density of from twenty-five to seventy-five, according to the Pusey and Jones Plastometer and a rubber roll in tangential contact therewith having a density at least twenty points harder.

4. Apparatus for laminating sheet material comprising a relatively fixed pressure roll and a movable pressure roll tangentially in contact, said movable roll being adjustable about the circumference of said relatively fixed roll, whereby to hold the laminated material in contact with the peripheral surface of said relatively fixed roll over a variable arc of contact, and means for drawing a plurality of adhesively coated sheets in facial contact between said rolls.

5. Apparatus according to claim 4, in which said fixed roll is formed of relatively yielding material, said fixed roll being less yielding than said movable roll.

6. Apparatus for laminating sheet material comprising two opposed contacting pressure rolls, a second set of pressure rolls comprising a relatively fixed roll and a movable roll tangentially in contact with said fixed roll, said relatively fixed roll being located approximately tangent to a line tangent to said first mentioned rolls, and means for drawing a plurality of strips of sheet material to be adhesively joined in facial contact through said rolls, said movable roll being adjustable about the periphery of said relatively fixed roll whereby to increase the area of contact of the sheet material over the periphery of said relatively fixed roll.

7. Apparatus for laminating sheet material comprising two opposed contacting pressure rolls, one of said rolls being less hard than the other, a second set of pressure rolls comprising a relatively fixed roll formed of yielding material, and a movable roll formed of more yielding material tangentially in contact with said fixed roll, said movable roll being adjustable about the periphery of said relatively fixed roll and means for drawing a plurality of strips of sheet material through said first mentioned rolls and said relatively fixed and movable rolls in succession.

KIMBERLY STUART.